United States Patent
Haer et al.

(10) Patent No.: US 9,865,852 B2
(45) Date of Patent: Jan. 9, 2018

(54) ENERGY STORAGE CONTAINER WITH VORTEX SEPARATOR

(71) Applicant: Tesla Motors, Inc., Palo Alto, CA (US)

(72) Inventors: Jason Haer, San Francisco, CA (US); Joseph Mardall, San Francisco, CA (US); Scott I. Kohn, Redwood City, CA (US); Adam Maser, San Jose, CA (US); Peter How, Sunnyvale, CA (US); Christopher Grimmer, Oakland, CA (US)

(73) Assignee: TESLA, INC., Palo Alto, CA (US)

( * ) Notice: Subject to any disclaimer, the term of this patent is extended or adjusted under 35 U.S.C. 154(b) by 307 days.

(21) Appl. No.: 14/750,591

(22) Filed: Jun. 25, 2015

(65) Prior Publication Data

US 2016/0380248 A1 Dec. 29, 2016

(51) Int. Cl.
| | |
|---|---|
| *H01M 2/12* | (2006.01) |
| *H01M 10/627* | (2014.01) |
| *H01M 10/656* | (2014.01) |
| *H01M 2/14* | (2006.01) |
| *H01M 2/10* | (2006.01) |
| *B04C 9/00* | (2006.01) |

(Continued)

(52) U.S. Cl.
CPC ................ *H01M 2/12* (2013.01); *B04C 3/06* (2013.01); *B04C 9/00* (2013.01); *H01M 2/1072* (2013.01); *H01M 2/1264* (2013.01); *H01M 2/14* (2013.01); *H01M 10/627* (2015.04); *H01M 10/6565* (2015.04); *B04C 2009/004* (2013.01); *H01M 2220/10* (2013.01)

(58) Field of Classification Search
CPC .... H01M 2/12; H01M 2/1072; H01M 2/1264; H01M 2/14; H01M 10/627; H01M 10/6565; H01M 2220/10; B04C 9/00; B04C 3/06; B04C 2009/004
See application file for complete search history.

(56) References Cited

U.S. PATENT DOCUMENTS

| | | |
|---|---|---|
| 5,028,318 A | 7/1991 | Aslin |
| 5,616,303 A | 4/1997 | Smolensky et al. |
| 6,149,825 A | 11/2000 | Gargas |

(Continued)

FOREIGN PATENT DOCUMENTS

| | | |
|---|---|---|
| EP | 1795753 B1 | 4/2015 |
| GB | 1493122 A | 11/1997 |

(Continued)

OTHER PUBLICATIONS

ELSR362-00001 RES 3.6kWh All in One User Manual, Samsung SDI, May 2015, 2 pages.

(Continued)

*Primary Examiner* — Eugenia Wang
(74) *Attorney, Agent, or Firm* — Garlick & Markison; Bruce E. Garlick

(57) ABSTRACT

A vortex separator includes: a housing having a cylindrical chamber therein; an inlet through a mantle of the cylindrical chamber, the inlet positioned at a proximal end of the housing; a pipe that enters the housing at the proximal end and extends axially through the cylindrical chamber toward a distal end of the housing which is closed; an outlet through the mantle, the outlet positioned at the distal end; and a catch basin at the outlet.

11 Claims, 6 Drawing Sheets

(51) Int. Cl.
  *B04C 3/06* (2006.01)
  *H01M 10/6565* (2014.01)

(56) References Cited

U.S. PATENT DOCUMENTS

| | | |
|---|---|---|
| 6,152,817 A | 11/2000 | Daniels |
| 6,245,300 B1 | 6/2001 | Garcia-Mallol |
| 6,467,569 B2 | 10/2002 | Noe |
| 7,390,339 B1 | 6/2008 | Warrick et al. |
| 7,644,711 B2 | 1/2010 | Creel |
| 8,557,416 B2 | 10/2013 | Mardall et al. |
| 8,860,377 B2 | 10/2014 | Scheucher |
| 2002/0046438 A1 | 4/2002 | Oh |
| 2004/0103785 A1 | 6/2004 | North |
| 2012/0325738 A1 | 12/2012 | Ford |
| 2016/0270613 A1* | 9/2016 | Demirtas .............. A47L 7/0023 |

FOREIGN PATENT DOCUMENTS

| | | | |
|---|---|---|---|
| JP | 2003236410 A | 8/2013 | |
| JP | 2013251127 A | 12/2013 | |
| WO | WO-2015078503 A1 * | 6/2015 | ........... A47L 7/0023 |
| WO | 2015125163 A1 | 8/2015 | |
| WO | 2015179625 A1 | 11/2015 | |

OTHER PUBLICATIONS

Hydrodynamic simulation of cyclone separators, Utikar et al., InTech, 2010, 27 pages.
Experimental and analytical study of the vortex in the cyclone separator, Joseph le Conte Smith, Jr., Massachusetts Inst. of Tech., 1959, abstract, 1 page.
Australian Government, IP Australia; Examination Report No. 2; 2016202742; dated Jul. 20, 2017; 6 pgs.
Australian Government, IP Australia; Examination Report No. 1; 2016202742; dated Dec. 8, 2016; 8 pgs.

* cited by examiner

ENERGY STORAGE CONTAINER WITH VORTEX SEPARATOR

BACKGROUND

In many areas, efforts are currently underway to transition the world's energy consumption from fossil fuels to renewable energy sources. Because today's electric grid is in part powered by non-renewable energy sources, the transition effort has in part focused on facilitating generation and storage of energy locally, instead of at remote power plants. This can involve solar power (i.e., photovoltaic panels that convert sunlight into electricity) or wind power (i.e., wind turbines at a wind farm). Because the output of these types of energy sources fluctuates during the day, and because the demand for energy does as well, the ability to store electric energy for later use becomes important.

One of the key technologies for storing electric energy is electrochemical cells (e.g., lithium-ion cells). Their advantages are well known: they have high energy density, can deliver significant power when necessary, and can be reused many times. Like most types of energy storage, electrochemical cells must be operated properly so as to give optimum performance and not malfunction. Such operation involves controlling the charging and discharging processes, as well as managing the temperature of the cells. In extreme situations, a cell that is malfunctioning can undergo a process called thermal runaway in which the cell generates excessive heat. Eventually the thermal runaway cell can begin emitting smoke and jets of electrolyte from its housing. This can affect nearby cells as well as other equipment.

SUMMARY

In a first aspect, a vortex separator includes: a housing having a cylindrical chamber therein; an inlet through a mantle of the cylindrical chamber, the inlet positioned at a proximal end of the housing; a pipe that enters the housing at the proximal end and extends axially through the cylindrical chamber toward a distal end of the housing which is closed; an outlet through the mantle, the outlet positioned at the distal end; and a catch basin at the outlet.

Implementations can include any or all of the following features. The vortex separator is configured for installation with the cylindrical chamber in a horizontal orientation. The outlet faces downward and the catch basin is positioned below the housing. The vortex separator further comprises a mesh that at least partially covers an opening of the pipe inside the cylindrical chamber. The mesh is cylindrical. The mesh extends from at least the opening of the pipe to the distal end. The pipe has a turn outside the housing, the turn providing an exhaust outlet that is vertically oriented. The catch basin comprises an upper portion having a substantially square cross section profile, and a lower portion having a rectangular cross section profile. The upper portion is wider than the lower portion.

In a second aspect, an energy storage container includes: a plurality of pods each containing electrochemical cells, the pods arranged in a vertical stack inside the energy storage container; a chimney; a plurality of exhausts from the pods into the chimney; a catch basin; and a vortex separator having: an inlet toward the chimney, a first outlet toward the catch basin, and a second outlet toward an outside of the energy storage container.

Implementations can include any or all of the following features. The chimney is defined by first and second parallel walls of the energy storage container, the second wall being an inner one of the first and second parallel walls and having the plurality of exhausts therein. The catch basin is defined in part by at least one partition wall between the first and second parallel walls. The inlet comprises an opening through the partition wall. The energy storage container further comprises an ash shelter that partially covers at least one lowermost exhaust of the plurality of exhausts. The ash shelter comprises a lower enclosure that is open at its top, and a roof that is separated from the top of the lower enclosure by a gap. The gap corresponds to one exhaust of the plurality of exhausts. The lower enclosure is wider at its bottom than at the top. The bottom is substantially as wide as the chimney. The vortex separator is positioned inside the catch basin. The chimney is positioned at a rear of the energy storage container, opposite a door to the plurality of pods.

DETAILED DESCRIPTION

This document describes examples of systems and techniques for managing systems of electrochemical cells during abnormal events such as thermal runaway. As discussed above, a thermal runaway event can lead to a forceful ejection of gas and other matter from the housing of an individual cell. The matter can be in form of larger pieces, such as a cap of the cell housing or a collector plate, and smaller particles, such as fragments of any of the cell's components. Whether large or small, the debris or other solid matter that can be ejected during a thermal event will herein collectively be referred to as "particles". Because of the significant heat generation, some particles can reach such temperatures that they glow or effectively become sparks. If sparks come in contact with gas, such as the smoke resulting from a thermal runaway event, there is a chance that ignition can occur. As such, it would be desirable to separate the sparks from the gas in an effort to minimize the consequences of the thermal event. Implementations of the present disclosure therefore seek to confine particles in an enclosed vessel called a catch basin, while allowing the gas to escape to the outside.

Figure 1:
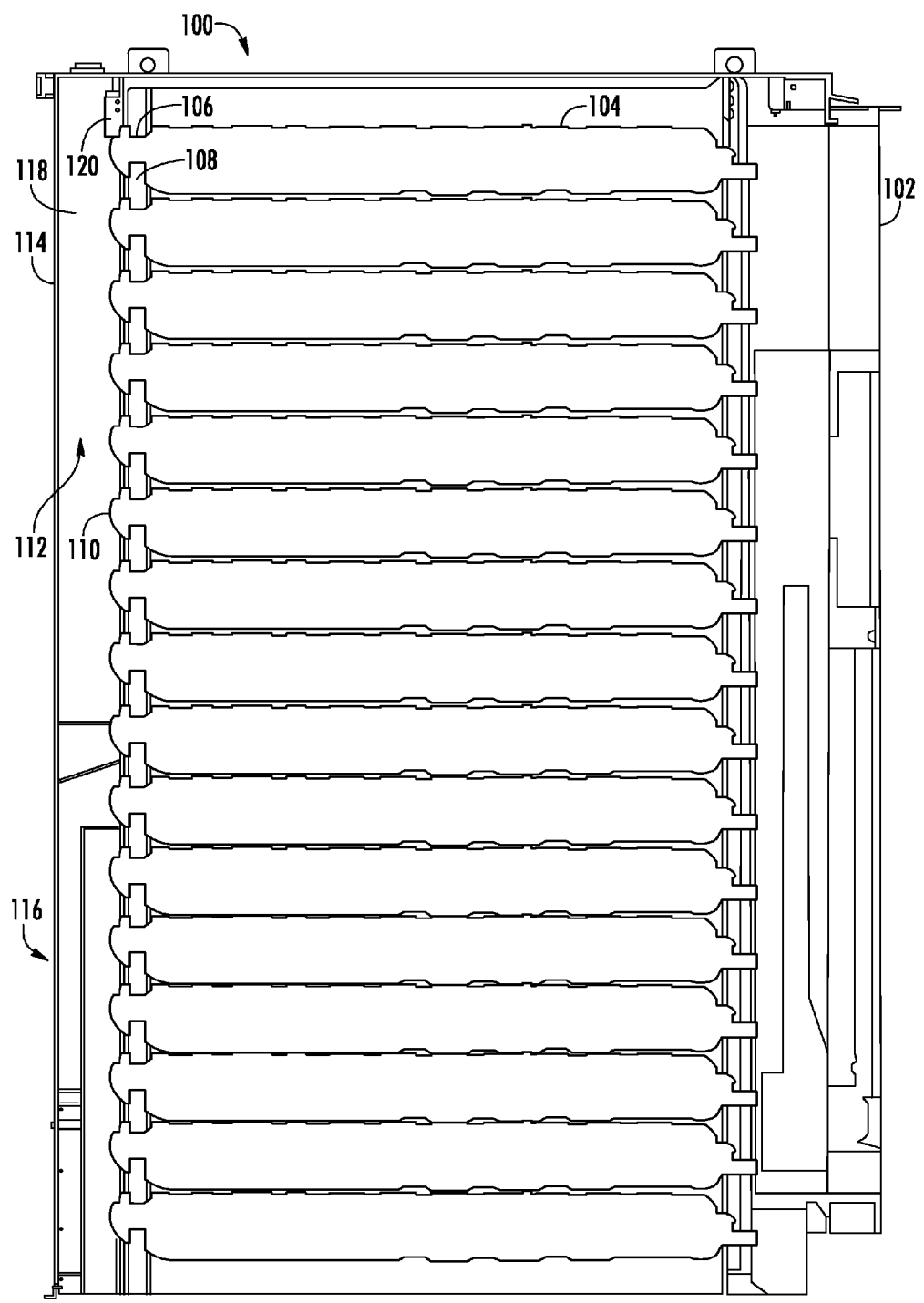
FIG. 1 shows a partial cross section of an energy storage container.

FIG. 1 shows a partial cross section of an energy storage container 100. In essence, the container holds batches of electrochemical cells (to be further described below) and controls the charging and discharging of them. The present container is essentially in the form of a cabinet having three side walls (e.g., left, right and rear walls) positioned between a top and a bottom. Here, the container has a door 102 that is hinged to the rest of the structure. The door which is currently closed provides service access to the electrochemical cells and to other components of the system, such as a battery management system, cooling system, and communications component.

Because this illustration is a cross section, pods 104 inside the container are visible. The pods are here arranged in a vertical stack between the top and bottom of the container. In this example, there are 16 pods in the container but other implementations can have more or fewer pods. Each of the pods holds a number of electrochemical cells (e.g., lithium-ion cells) that are coupled to each other, and to control components, so as to be able to receive energy (during charging) and deliver it upon demand (i.e., during discharging). For example, the pod can include cells that collectively provide a certain DC voltage, and also a DC-DC converter that converts the cell voltage to a particular (higher) DC voltage. That cumulative voltage from all pods can then serve as the output electricity from the energy storage container. For example, the container can provide DC to an inverter (not shown) that generates AC for use in a residence or at a business location. The pods, which can be of a different size or proportions in some implementations, can be made of any material that is suitable given the types of cells and the intended use.

Each of the pods is an essentially closed structure having an outlet 106 towards (in this example) its rear. That is, contacts for electricity and communications can be made elsewhere on the pod, and the outlet is designed to allow gas and particles to escape in the case of a thermal event. Each of the outlets is here fitted into a corresponding opening of an interior wall 108 in the container. A small part of each outlet (e.g., a cap or other closure) extends on the other side of the interior wall 108 where it forms a respective exhaust 110 for that pod.

A chimney 112 is formed between the interior wall 108 and an outer wall 114. In this example, the two walls are parallel to each other and serve to define the chimney at the rear of the container. The chimney allows gas and particles to escape the pods through the exhausts 110. An ash shelter 116 here partially encloses the bottommost exhausts. The ash shelter protects the exhausts of the lowest pods from becoming clogged by particles dropping from the exhausts of higher-up pods. That is, the ash shelter allows the covered pods to exhaust their own gas and particles but reduces the accumulation in front of them of particles from pods above. In other implementations, more or fewer pod exhausts can be covered by the ash shelter.

A partition wall 118 is here positioned between the interior wall 108 and the exterior wall 114 and is part of the structure that forms the chimney. As will be described below, the partition can also define a catch basin. In particular, the partition wall here has an opening 120 where gas and particles can escape the chimney and thereby be further removed from the pods. For example, the generated gas can escape into the ambient surroundings while particles can be collected in a catch basin so as to separate them from the gas as much as possible.

Figure 2:
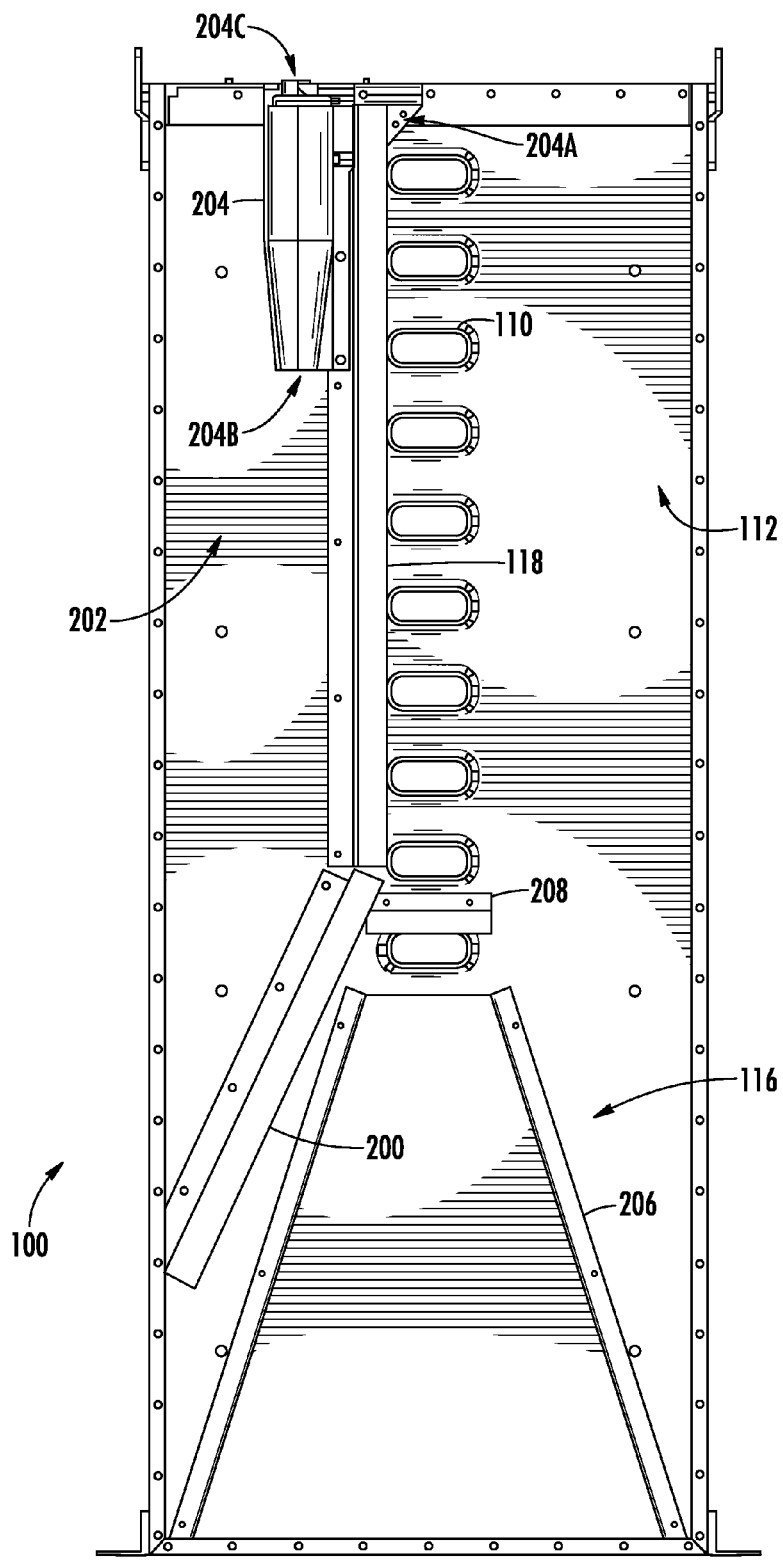
FIG. 2 shows a plan view of the energy storage container in FIG. 1.

FIG. 2 shows a plan view of the energy storage container 100 in FIG. 1. Here, the exterior wall 114 (FIG. 1) has been omitted so as to show the chimney 112, the exhausts 110 and related structures. Particularly, it is seen that the partition wall 118 and another partition wall 200 serve to define a catch basin 202. The catch basin is an essentially enclosed structure that will accumulate particles exhausted from any of the pods.

The container here has a vortex separator 204 for the separation of particles (i.e., potentially sparks) from escaping gas (which may be combustible). Particularly, the vortex separator receives an influx of gas and particles through an inlet 204A. For example, the inlet is formed by having a portion of the vortex separator facing an opening in the partition wall into the chimney. Within the vortex separator, the flowing gas and particles are directed into a helical flow inside a cylinder housing. The housing has an outlet 204B at it bottom and an exhaust 204C at its top. The helical flow causes particles to drop out at the outlet 204B and fall into the catch basin, whereas the gas is directed upward and escapes out the exhaust 204C. That is, the vortex separator is here positioned inside the catch basin but in other implementations it can be located elsewhere, such as outside the container or inside the chimney.

The ash shelter 116 is located toward the bottom of the exhausts 110. Here, the ash shelter comprises a lower enclosure 206 and a roof 208. The lower enclosure covers one or more of the lowermost exhausts (here the bottom six) and is enclosed on all sides except at the top (i.e., it has an opening facing upward). The opening allows gas and particles from the lower exhausts to escape. The roof, moreover, prevents particles that fall from upper exhausts from accumulating in front of the lower exhausts. Instead, such particles will be directed towards spaces between the lower enclosure and the walls of the chimney.

The lower enclosure 206 and the roof 208 are separated by a gap. That is, this gap allows gas and particles from within the lower enclosure to escape (and ultimately reach the vortex separator) whereas the roof blocks particles falling down. In this example, the gap corresponds to the size of one of the exhausts (here the seventh from the bottom).

The lower enclosure 206 can be wider at its bottom that at its top. For example, a relatively wide base allows room for particles to accumulate inside the enclosure without covering any exhausts, whereas a relatively narrow opening prevents particles from falling into the enclosure. Here, the base of the lower enclosure is essentially as wide as the chimney but it can be narrower in some implementations.

In the above examples, the vortex separator was oriented vertically which aided in the separation of particles from gas because the particles fell out the bottom into a catch basin. Other implementations can have different orientations, however.

Figure 3:
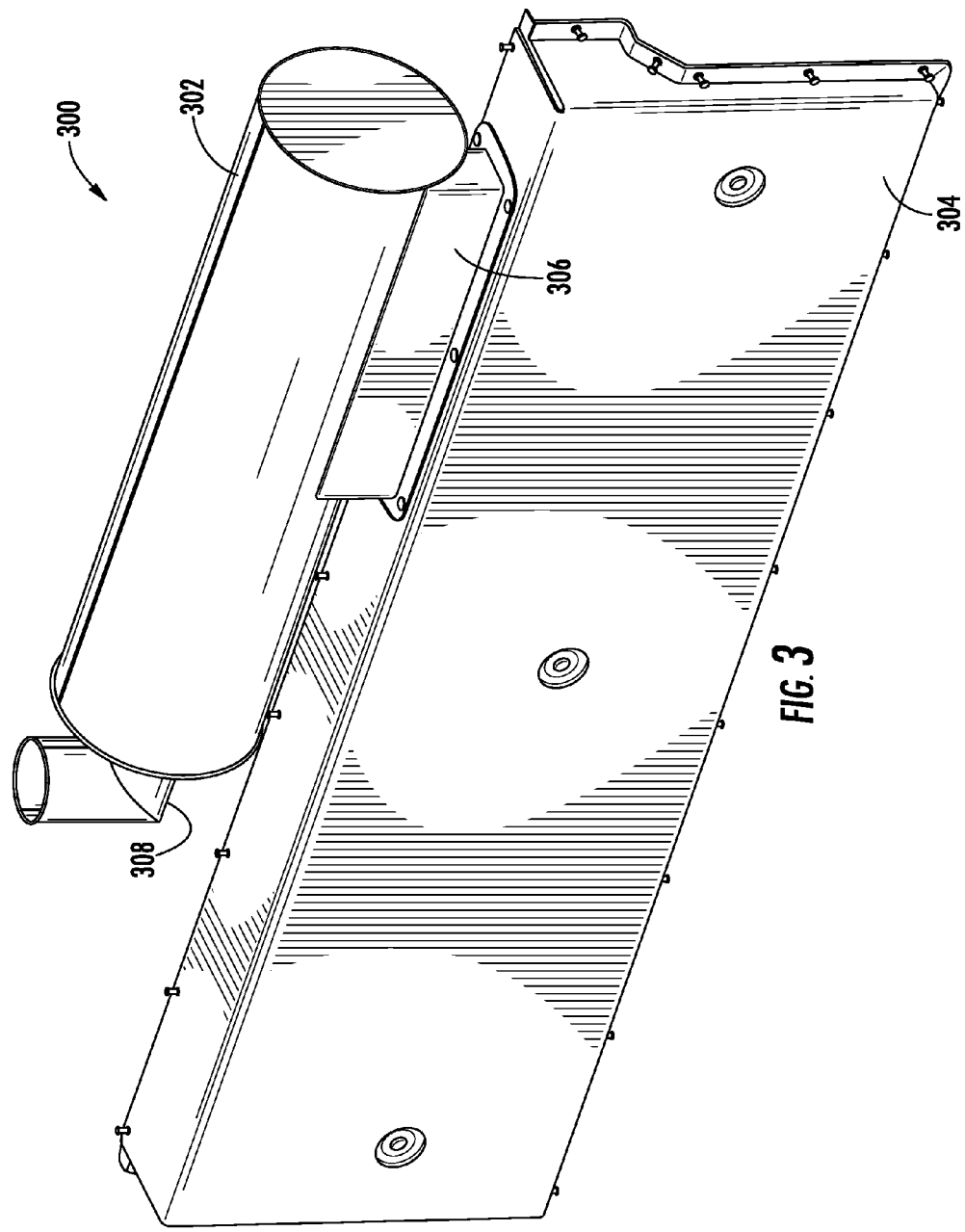
FIG. 3 shows a perspective view of a vortex separator.

FIG. 3 shows a perspective view of a vortex separator 300 to be oriented horizontally. The separator here has a housing 302 that has substantially a cylinder shape, and a catch basin 304 positioned underneath the housing. They are connected by an outlet 306 that allows particles to exit the housing, as will be described later. The separator also has an exhaust outlet 308 for gas to escape. For example, the vortex separator can be mounted to an enclosure for electrochemical cells that is oriented vertically so that its exhaust direction is upward. Gas and particles generated during a thermal event enter the separator through an inlet (not shown), and once inside, the particles can be separated from the gas to reduce the risk of ignition.

Figure 4:
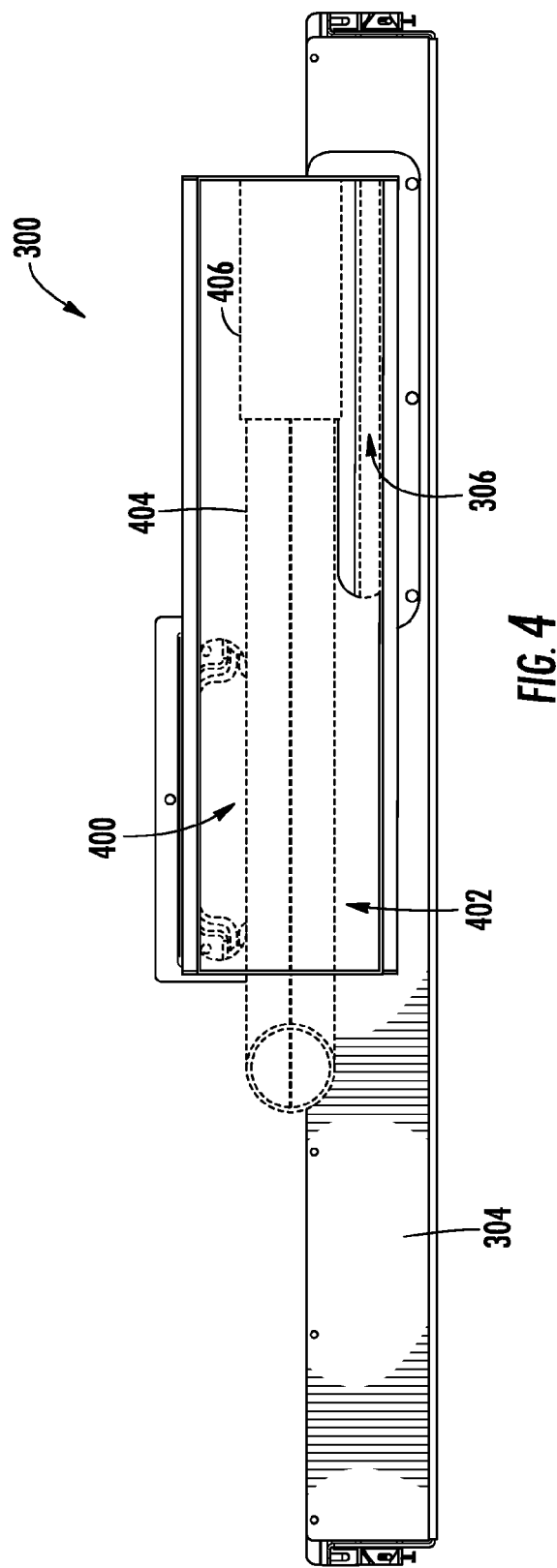
FIG. 4 shows a top view of the vortex separator in FIG. 3.

FIG. 4 shows a top view of the vortex separator 300 in FIG. 3. Some features are shown in phantom. Particularly, an inlet 400 allows gas and particles (e.g., from a chimney) to enter into a cylindrical chamber 402. A pipe 404 here enters the housing of the separator at one end and extends axially through the cylindrical chamber toward the other end, which is closed. The pipe forms one or more openings inside the cylindrical chamber; here, the end of the pipe is truncated to present a circular opening. The opening is here covered by a mesh 406. The outlet 306 connects the cylindrical chamber to the catch basin 304.

Figure 5:
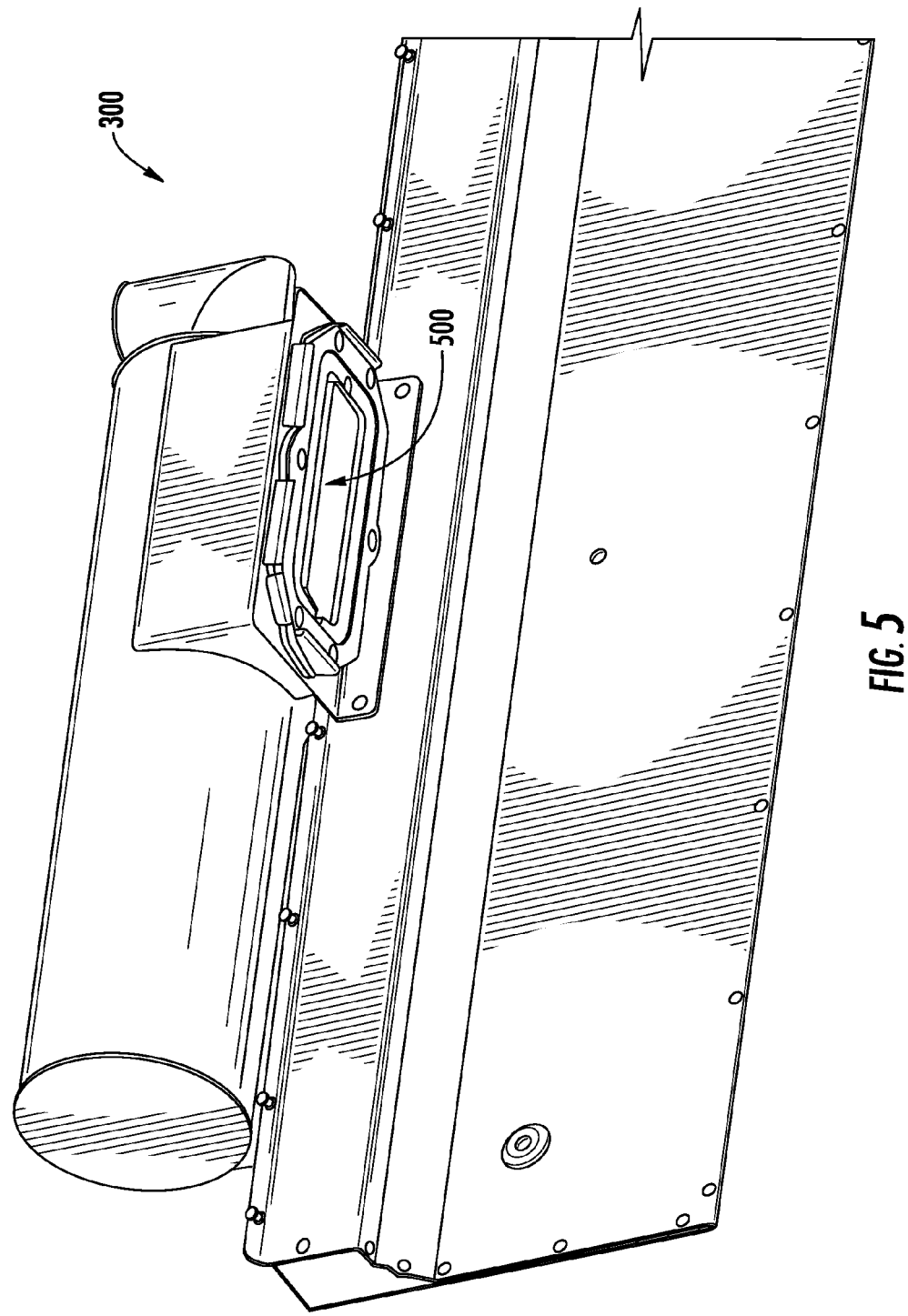
FIG. 5 shows another perspective view of the vortex separator in FIG. 3.

FIG. 5 shows another perspective view of the vortex separator 300 in FIG. 3. Here, an inlet 500 is visible. For example, this inlet faces toward a chimney (or directly into an exhaust of a pod of cells) so as to receive gas and particles.

Figure 6:
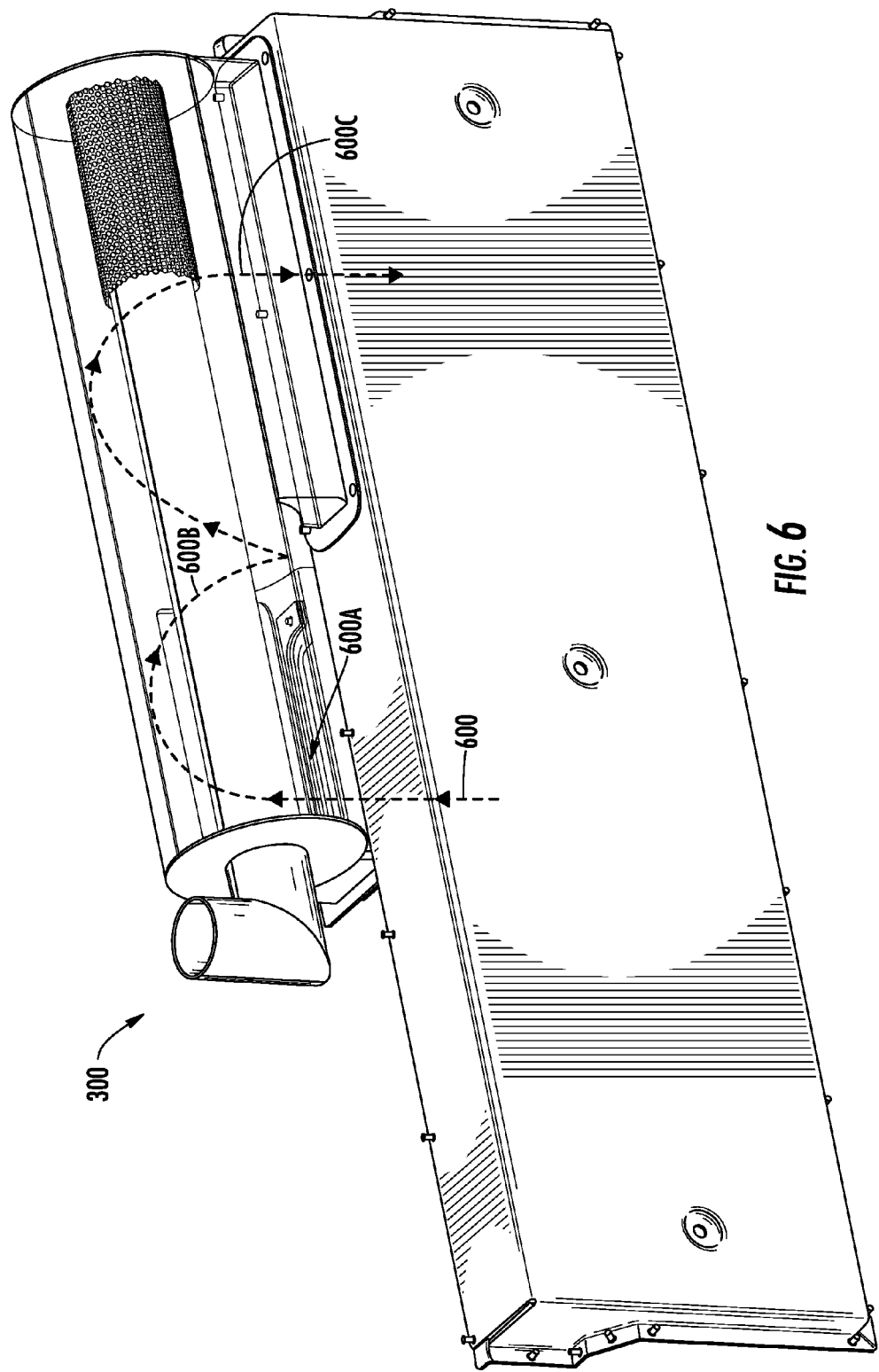
FIG. 6 shows another perspective view of the vortex separator in FIG. 3.

FIG. 6 shows another perspective view of the vortex separator 300 in FIG. 3. An outer cover of the cylindrical housing has here been omitted for clarity. Particularly, an arrow 600 schematically illustrates an exemplary path for a particle. That is, the particle, which is being propelled by the flow of gas through a chimney or other structure, enters the cylindrical chamber at 600A. At 600B, the particle (and the gas) is following a helical path inside the cylindrical chamber. That is, because the inlet is tangentially oriented relative to the cylindrical chamber, the gas is directed to flow in a helix inside the cylindrical chamber. During this motion, the heavier components of the flowing matter are driven to the periphery of the cylindrical chamber. As such, the particles, which are heavier than the gas and have more momentum tend to move along the cylinder surface. Eventually, the particle exits the cylindrical chamber at 600C because the outlet is also tangentially positioned relative to the cylindrical chamber. There, the particle falls into the catch basin, having thereby been separated from the majority of the flowing gas.

The flowing gas, on the other hand, cannot escape by way of the catch basin because this is an enclosed structure. As such, when the pressure builds inside the catch basin the gas will escape through another route. Particularly, the gas enters the pipe through its opening inside the cylindrical chamber and is allowed to escape to the outside of the vortex separator (e.g., into the atmosphere). That is, the particles that were present in the flowing gas are thereby separated from the gas so as to reduce the risk of ignition.

A mesh on the pipe can block stray particles from entering with the gas. For example, some particles might otherwise bounce off the cylindrical wall into the pipe. In particular, the flow of gas can be intermittent due to the nature of the chemical reactions taking place in the cells during thermal events. As such, a particle that was originally traveling inside the cylindrical chamber could come to rest on the surface thereof when the flow subsides. When the flow increases again, the particle can be thrown in an erratic direction and be bounced off the mesh, but will eventually exit the chamber into the catch basin.

A number of implementations have been described as examples. Nevertheless, other implementations are covered by the following claims.

What is claimed is:

1. An energy storage container comprising:
   a plurality of pods each containing electrochemical cells, the pods arranged in a vertical stack inside the energy storage container;
   a chimney;
   a plurality of exhausts from the pods into the chimney;
   a catch basin; and
   a vortex separator having: an inlet toward the chimney, a first outlet toward the catch basin, and a second outlet toward an outside of the energy storage container.

2. The energy storage container of claim 1, wherein the chimney is defined by first and second parallel walls of the energy storage container, the second wall being an inner one of the first and second parallel walls and having the plurality of exhausts therein.

3. The energy storage container of claim 2, wherein the catch basin is defined in part by at least one partition wall between the first and second parallel walls.

4. The energy storage container of claim 3, wherein the inlet comprises an opening through the partition wall.

5. The energy storage container of claim 1, further comprising an ash shelter that partially covers at least one lowermost exhaust of the plurality of exhausts.

6. The energy storage container of claim 5, wherein the ash shelter comprises a lower enclosure that is open at its top, and a roof that is separated from the top of the lower enclosure by a gap.

7. The energy storage container of claim 6, wherein the gap corresponds to one exhaust of the plurality of exhausts.

8. The energy storage container of claim 6, wherein the lower enclosure is wider at its bottom than at the top.

9. The energy storage container of claim 8, wherein the bottom is substantially as wide as the chimney.

10. The energy storage container of claim 1, wherein the vortex separator is positioned inside the catch basin.

11. The energy storage container of claim 1, wherein the chimney is positioned at a rear of the energy storage container, opposite a door to the plurality of pods.

* * * * *